United States Patent Office.

THOMAS BRISTOW, OF CRANSTON, RHODE ISLAND, ASSIGNOR TO AMASA SPRAGUE, OF SAME PLACE.

Letters Patent No. 104,259, dated June 14, 1870.

PREPARATION OF COLORING-MATTER FROM MADDER FOR DYEING.

The Schedule referred to in these Letters Patent and making part of the same.

*To whom it may concern:*

Be it known that I, THOMAS BRISTOW, of Cranston, in the county of Providence and State of Rhode Island, have invented certain new and useful Improvements in the Preparation of Coloring-Matter for Dyeing; and I hereby declare the following to be a full, clear, and exact description of the same.

This invention relates to a mode of utilizing and treating the waste product, refuse, or residuum arising in the manufacture of an extract of madder called oleizarine; and It consists in treating said product with chalk, or an equivalent alkaline, and subjecting it to the action of steam or heat in the dye-beck, where it may be applied, in combination with mordants, to calicoes and other textiles, in the usual way.

Oleizarine, according to the invention claimed by Alfred Paraf, is produced by boiling garancine in refined petroleum or kerosene oil, about three parts of oil being used to one part of madder. Several successive boilings are made, and, after each, the oil and coloring-matter mixed with it are pressed or separated from the madder, and drawn off into vessels where water is added, and caustic soda, or its equivalent, is employed to precipitate the coloring-matter, and separate it from the oil. The oil, being thus freed from coloring-matter, may be again used for boiling, while color is separated from the water by suitable means, to which I need not here refer, the product being a pasty mass called oleizarine.

The madder or garancine is usually boiled three times in oil, so as to obtain as much oleizarine as possible, and is pressed in a hydraulic press to remove the oil from it. There is then left a residuum, which, heretofore, has been considered waste, and unfitted for dyeing purposes, and which, consequently, has been thrown away.

The oleizarine extracted from the garancine is but a small proportion of the whole mass, say ten per cent., and so great a quantity of madder is, therefore, required for the manufacture as to render the use of the oleizarine, as a material for printing or dyeing, too expensive to be practically available. Indeed, the process, as heretofore conducted, may be said to be entirely useless and impracticable in a commercial or manufacturing point of view.

Numerous investigations and attempts to recover the madder thus wasted have been instituted by me, and have led to the discovery that, when the refuse or residuum is treated or mixed with chalk, or its equivalent, to neutralize the acid of the residuum, and then mingled with water in the dye-beck, and subjected to the action of steam or heat, most if not all of the waste can be utilized for dyeing purposes, thus effecting a saving of valuable coloring-matter, as well as of any oil that may remain in the residuum.

To enable those skilled in the art to understand and use this invention, I shall now proceed to describe the manner in which the same is or may be carried into effect.

I prepare the oleizarine in the manner above described, that is to say, by boiling, say, one part of garancine in three parts of kerosene oil.

The garancine is subjected, usually, to three boilings, and after each the oil is pressed from it and drawn off into tanks or vessels, where it is treated as above mentioned, so as to separate from it the coloring-matter extracted from the garancine.

This coloring-matter, first precipitated in water, is then separated therefrom by filtering or straining, the resulting product being the oleizarine.

This process it is not necessary to further describe, as my invention does not concern it, but relates only to the treatment of that which has hitherto been considered a waste product.

This waste product is the residuum of garancine, which remains when the oil has been pressed from it after the last boiling. I collect this residuum and mix with it chalk, or an equivalent alkaline or neutralizing agent. The proportion of chalk will vary in accordance with the nature of the residuum, which can only be ascertained by trial. I employ usually from two to ten per cent.

The mixture, thus prepared, is put in the dye-beck, in which a proper quantity of water is introduced, and the water is then, in the usual way, brought to the requisite temperature, heat being applied, and the mixture being treated in the ordinary way in which dye-stuffs are treated in the dye-beck. The quantity of the prepared residuum placed in the dye-beck is to be governed by the usual rules, and the material is, in fact, ready to be used as an ordinary dye-stuff is used.

I thus utilize a product which has heretofore been considered worthless for dyeing purposes, and render practically available the oleizarine process, which, without this, would be too expensive and costly for manufacturing purposes.

The residuum can be used for dyeing all madder colors, and may be employed with or without mixture with other coloring-matters. The purple obtained from it is peculiar, in that it closely resembles oleizarine purples, while it gives also an excellent red.

Having now described my invention,

What I claim, and desire to secure by Letters Patent, is—

The method, herein described, of treating the waste product or residuum resulting in the manufacture of oleizarine, in the manner and for the purpose set forth.

In testimony whereof I have signed my name to this specification before two subscribing witnesses.

THOMAS BRISTOW.

Witnesses:
SAMUEL B. PARKER,
AMASA SPRAGUE.